(12) United States Patent
Kirk et al.

(10) Patent No.: US 6,343,254 B1
(45) Date of Patent: Jan. 29, 2002

(54) SEAMLESS SURVEYING SYSTEM

(75) Inventors: Geoffrey R. Kirk, San Francisco; Darin Muncy, San Jose, both of CA (US); Joseph V. R. Paiva, Shawnee, KS (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/177,780

(22) Filed: Oct. 22, 1998

(51) Int. Cl.$^7$ .................................................. G06G 7/78
(52) U.S. Cl. .................................. 701/216; 342/357.14
(58) Field of Search .................................. 701/216, 223, 701/213; 342/357.14, 357.1, 357.02, 357.06, 357.17

(56) References Cited

U.S. PATENT DOCUMENTS

| | | | |
|---|---|---|---|
| 5,471,218 A | 11/1995 | Talbot et al. ............... 342/367 |
| 5,519,620 A | 5/1996 | Talbot et al. ............... 364/449 |
| 5,734,348 A | * 3/1998 | Aoki et al. ............ 342/357.17 |
| 6,078,285 A | * 6/2000 | Ito ......................... 342/357.17 |

* cited by examiner

Primary Examiner—Gregory C. Issing
(74) Attorney, Agent, or Firm—Wagner Murabito & Hao LLP

(57) ABSTRACT

A survey system and method for determining the best source of position data for a particular application. The system includes both an optical unit and a satellite positioning system (SATPS) unit for obtaining position data. The optical unit includes a theodolite and an electronic distance meter for determining the position of a rover unit. The SATPS unit includes a SATPS antenna and a SATPS receiver for receiving signals from satellites of the SATPS and a radio for coupling the received signals to the rover unit. The present invention automatically determines the best source of position data. The best source of position data is then used to calculate the position of the rover unit.

5 Claims, 11 Drawing Sheets

| OPTICAL VARIABLES | weighting factor |
|---|---|
| separation distance | 80% |
| signal strength | 20% |

| SATPS VARIABLES | weighting factor |
|---|---|
| separation distance | 80% |
| number of satellites | 10% |
| RTK correction data accuracy | 10% |

FIG. 9

SEAMLESS SURVEYING SYSTEM

TECHNICAL FIELD

This invention relates to systems and methods for determining position. More specifically, the present invention relates to an apparatus and method for determining the optimum source of data for position determination when GPS data and optical data may be available. The optimal source of position data is then used to determine position.

BACKGROUND ART

Historically, surveying has been accomplished using optical sighting methods. Optical sighting methods typically involve the determination of distance, vertical angle and horizontal angle and slope with reference to a known location at which a sighting device is operated (reference site) by sighting to a remote location which is positioned (the positioned site). Optical sighting methods provide a high degree of accuracy as long as the distance between the reference site and the positioned site are short.

Recently, automated position determination systems have been used for position determination in surveying applications. One such system uses the constellation of Satellites in the Global Positioning System (GPS) operated by the U.S. Air Force. The GPS consists of a constellation of 24 orbiting satellites that transmit signals via microwave radio. These signals may be used by appropriately configured receivers to determine position.

One method for determining position uses the Coarse Acquisition (C/A) code from four or more satellites to determine position. The satellites mark their transmission digitally and the receiver compares the time it receives the time mark with its own time clock. The time delay, referred to as transit time, is typically in the range of about 70–90 milliseconds. Pseudoranges are then determined by multiplying transit time by the speed of radio transmissions (approximately 300,000,000 meters/second). Position is then determined using a geometric calculation that uses the ephemerides and calculated pseudoranges. GPS based positions are calculated using the World Geodetic System of 1984 (WGS84) coordinate system. These positions are expressed in Earth Centered Earth Fixed (ECEF) coordinates of X, Y, and Z axis. These positions are often transformed into Latitude, Longitude, and Height relative to the WGS84 ellipsoid.

Errors arise in the determined position due to timing/clock errors, intentional introduction of error by the U.S. Air Force (referred to hereinafter as "selective availability" or "S/A") and errors due to atmospheric conditions. Atmospheric models can be used to partially correct for errors due to atmospheric conditions. However, because such corrections are inaccurate, they result in a determination of position that is not highly accurate.

For surveying applications a high degree of accuracy is required in determining position. Therefore, a position determination technique which provides the necessary accuracy by correcting for S/A, and correcting for atmospheric conditions is typically used. One such method is real time kinematic (RTK) position determination. RTK systems typically include a reference GPS receiver and a roving GPS receiver. The reference GPS receiver receives signals from GPS satellites. Then, either correction data or raw observables data is transmitted to a roving GPS receiver. The roving GPS receiver also receives signals from GPS satellites. The signals received by the roving GPS receiver and the data from the reference GPS receiver are then used to determine the position of the roving GPS receiver with a high degree of accuracy. Typically carrier phase measurements are used to determine position in RTK systems. RTK systems provide a high degree of accuracy provided that the differential separation distance between the reference GPS receiver and the roving GPS receiver is within a predetermined range. However, at very short distances, optical methods are more accurate than RTK methods.

Optical system are often undesirable for use in a particular survey due to obstructions and terrain contours that prevent direct visual observation of a remote location to be positioned. When obstructions prevent optical measurements or when the distances are so great that optical measurements do not provide the required accuracy, RTK systems are often used.

However, either an optical system or a GPS system alone is usually used to survey a particular location. This requires an advance determination as to which system is to be used each time a survey is to be taken. This process is time consuming and requires an in-depth knowledge of the capabilities and limitations of each system. Also, an in-depth knowledge of the location to be surveyed is required. What is needed is an apparatus and method for surveying that incorporates the advantages of both optical systems and GPS systems. In addition, a method for accurately determining position is needed that uses both optical measurements and GPS measurements. Furthermore, a surveying system that is easy to use and operate is required.

DISCLOSURE OF THE INVENTION

The present invention provides a system that swiftly and automatically determines which type of data will provide the best survey of a particular site. The best source of position data is then used to determine the desired position.

In one embodiment of the present invention, the seamless surveying system includes a Satellite Positioning System (SATPS) unit, an optical unit and a rover unit. In one embodiment, SATPS signals from satellites of the US Global Positioning System (GPS) are received at the SATPS unit and are coupled to the rover unit. The rover unit includes a target that is adapted to be engaged by the optical unit for optically determining the position of the rover unit. The rover unit includes logic for determining the optimum source of positioning data to be used to determining position. When the seamless surveying system includes a SATPS unit and an optical unit, the rover unit determines whether optical data from the optical unit or SATPS data from the SATPS unit are to be used for determining position.

In one embodiment, the optimum source of position data is chosen based on time. That is, the first received source of position data is determined to be the optimum source of position data. The optimum source of position data is then used to determine position. Thus, when optical data is received first, optical data is used to determine position. Similarly, when SATPS data is received first, SATPS data is used to determine position. This allows for the fastest computation of position.

In another embodiment, the optimum source of position data is chosen based on the distance between the rover unit and the optical system. That is, because optical data give good results at short distances, if both optical data and SATPS data are available, and if the distance is less than a predetermined threshold (the optical threshold), optical data is used. Since SATPS data gives good results at longer distances, SATPS data is used when the distance is greater than or equal to the optical threshold.

In another embodiment, a weighting process is used to determine the optimum source of position data.

In yet another embodiment, the measurements from both the optical unit and the SATPS unit are combined to determine position.

The seamless surveying system of the present invention monitors multiple sources of position data and selects from the available sources of position data the optimum source of position data for a particular application. Therefore, there is no need for the user to determine which type of system to use as is required with prior art systems. Because the determination is automatic, there is no need for human intervention for changing from one system to another. In addition, the seamless surveying system of the present invention is easy to use since data from the optimum source of position data is automatically coupled to the rover unit and is used for accurate determination of position.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 9 is a chart showing an example of weighting variables and weighting factors used to determine the optimum source of position data in accordance with the present claimed invention.

BEST MODE FOR CARRYING OUT THE INVENTION

Figure 1:
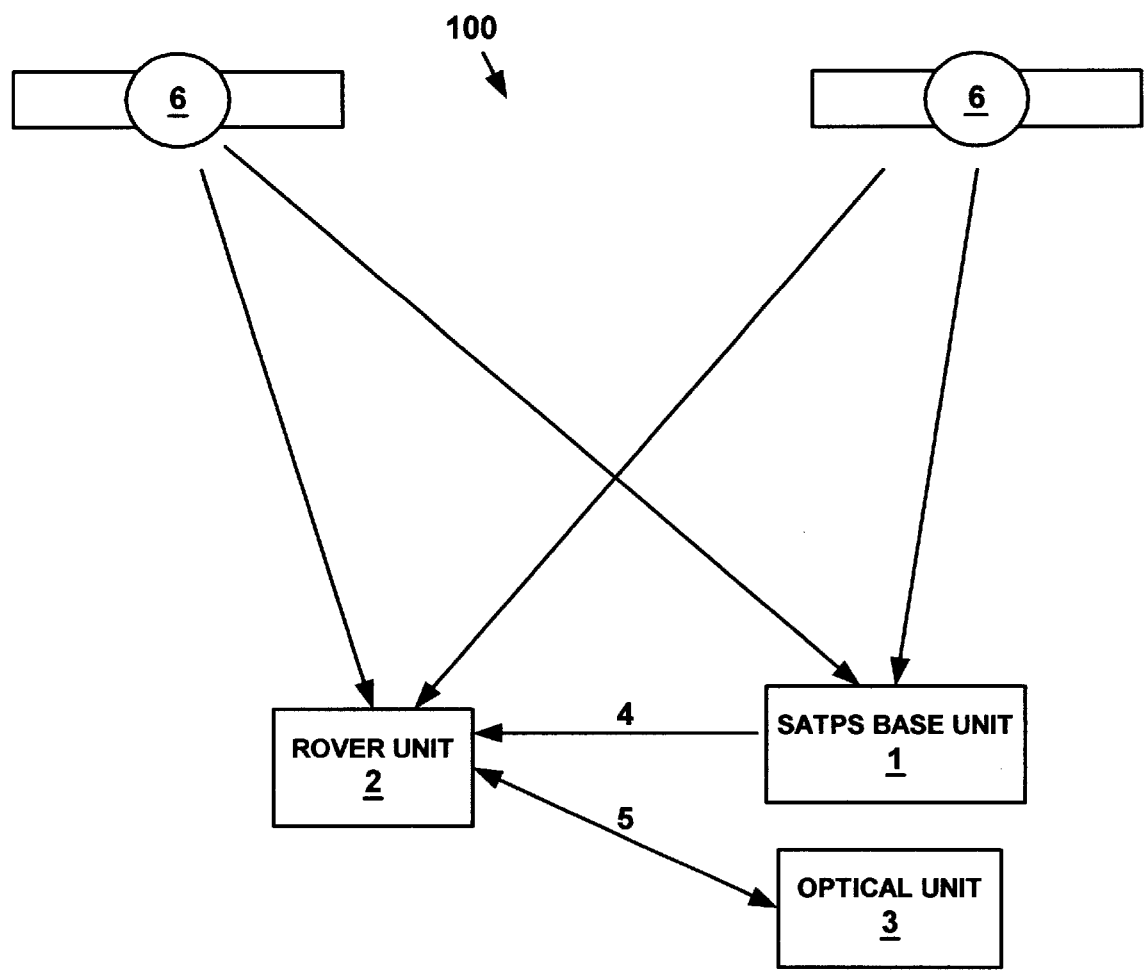
FIG. 1 is a schematic diagram of a seamless surveying system that is receiving signals from satellites of a SATPS in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating", "incorporating", "calculating", "determining", "communicating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

Although the methods and apparatus of the present invention are described with reference to the use of a Satellite Positioning System (SATPS) for determining position, it will be appreciated that the teachings are equally applicable to positioning systems that utilize pseudolites or a combination of pseudolites and satellites. Pseudolites are ground-based transmitters that broadcast a Pseudo Random Noise (PRN) code (similar to a SATPS signal) modulated on an L-band carrier signal, generally synchronized with SATPS time. Typically, each transmitter is assigned a unique PRN code so as to permit identification by a remote receiver. The term "SATPS", as used herein, is intended to include pseudolite or equivalents of pseudolites, and the term "SATPS signals" and "SATPS data", as used herein, is intended to include SATPS-like signals and data from pseudolites or equivalents of pseudolites.

In one embodiment, the SATPS uses satellites of the U.S. Global Positioning System (GPS). However, the methods and apparatus of the present invention are equally applicable for use with other satellite-based positioning systems such as, for example the GLONASS system. The GLONASS system includes satellites that emit signals at slightly different carrier frequencies, with individual satellites identified by the frequency of transmission. Alternatively, signals from other sources such as LORAN, Wide Area Augmentation System (WAAS) satellites, etc. may be used to determine position.

Referring now to FIG. 1, a number of satellites, shown generally as satellites 6 associated with the SATPS transmit their positions in a broadcast mode to all points within their respective fields of view on the earth's surface. Reference stations can determine their positions using the SATPS data directly received from satellites 6 ("uncorrected SATPS data"). Signals received directly from satellites are corrupted by a number of error sources such as, for example, Selective Availability, ephemeris prediction errors, timing errors, and errors in the estimation of ionospheric and tropospheric delay.

Continuing with FIG. 1, in the present invention, a reference station such as SATPS base unit 1 that receives uncorrected SATPS data from satellites 6 and retransmits the uncorrected SATPS data as shown by arrow 4. The transmitted uncorrected SATPS data from SATPS base unit 4 is used by other SATPS receivers such as rover unit 2 to accurately determine position. Methods for determining position using multiple SATPS receivers are well known in the art and include RTK methods that use carrier signals to accurately determine position. However, other methods such as "differential" correction methods may also be used to determine the position of rover unit 2.

Still referring to FIG. 1, in addition to SATPS base unit 4 and rover unit 2, seamless surveying system 100 also includes an optical system such as optical unit 3. Optical unit 3 includes an optical system capable of determining the position of a target. In one embodiment, rover unit 2 communicates with optical unit 3 via a communication link as shown by arrow 5 to indicate that position is to be determined. Optical unit 3 then determines the position of rover unit 2 relative to optical unit 3. Optical data from optical unit 3 is then coupled to rover unit 2.

Figure 2:
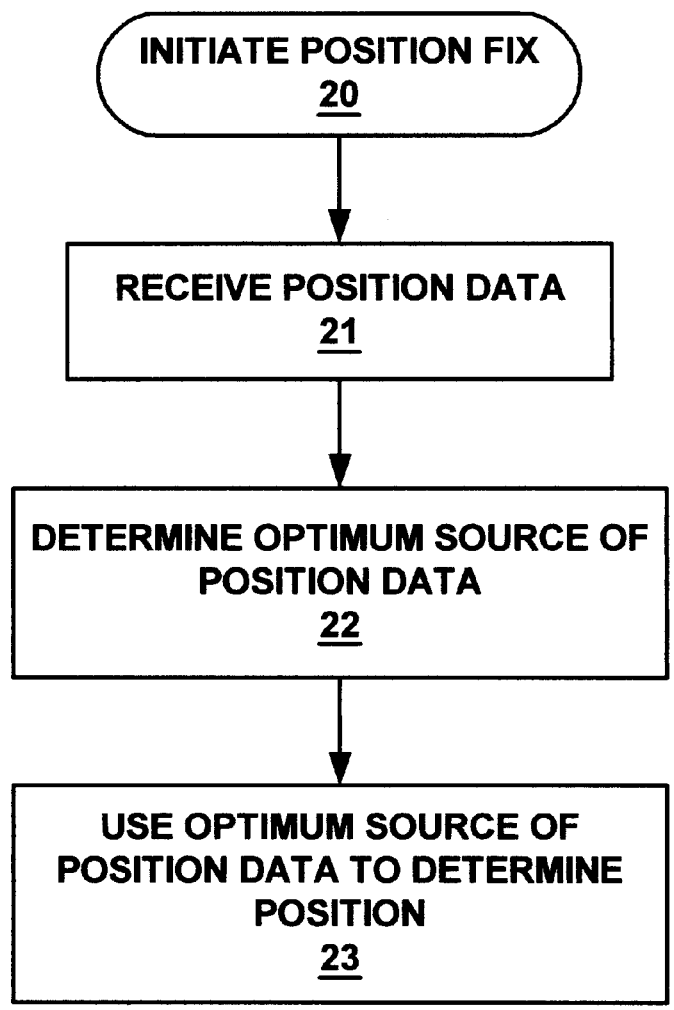
FIG. 2 is a flow chart illustrating a method for determining position that uses the optimum source of position data in accordance with the present claimed invention.

Referring now to FIG. 2, a method for determining position using the optimum source of position data is shown. When a user desires to determine position, the user initiates the position fix as shown by step 20. That is, the user takes some action to start the position determination process.

Figure 3:
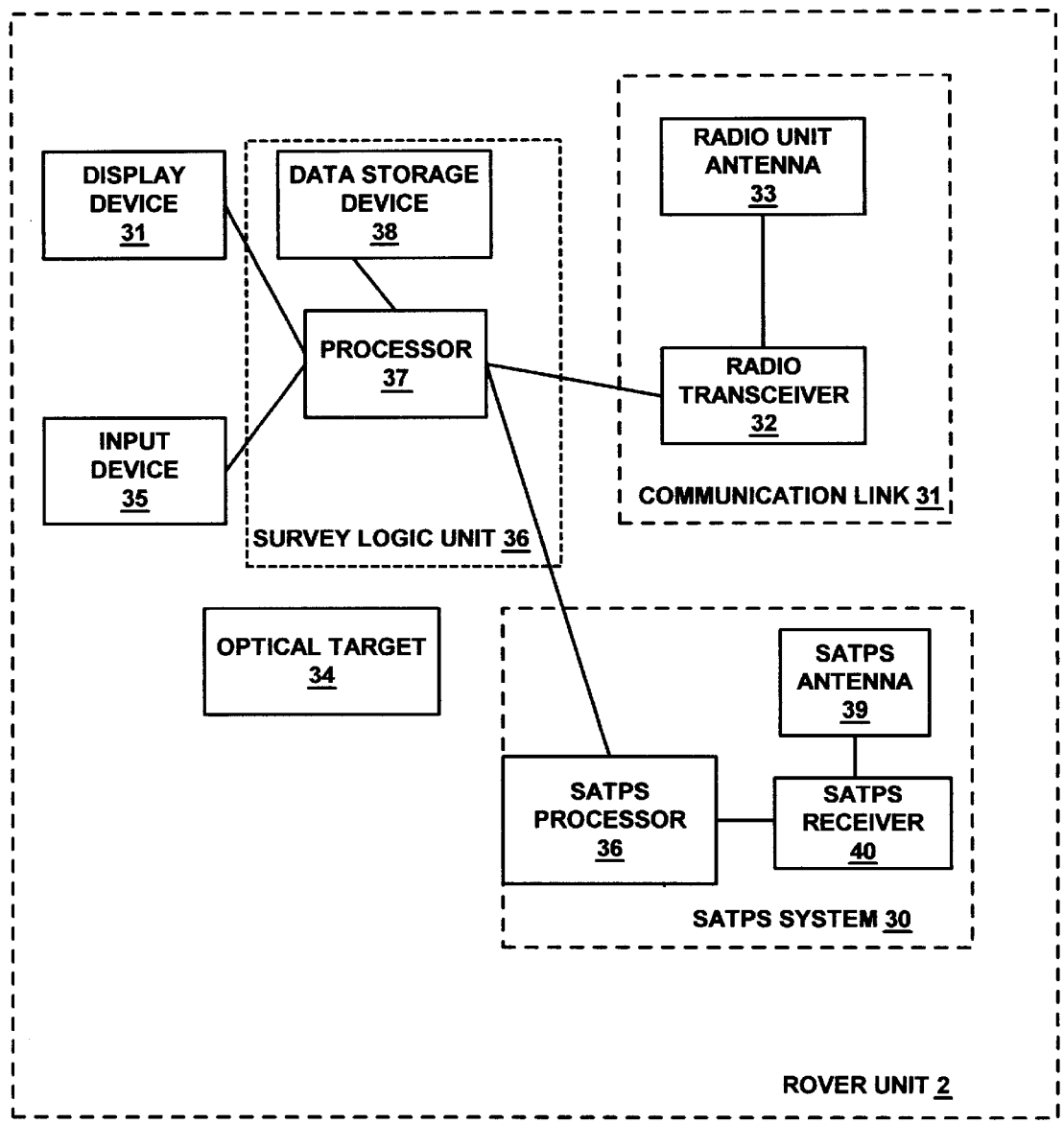
FIG. 3 is a diagram of a rover unit in accordance with the present claimed invention.

Referring to FIG. 3, an embodiment of a rover unit is shown. In this embodiment, rover unit 2 includes an input device 35 that is used to initiate the position fix. In one embodiment input device 35 is a keypad which includes a standard keypad. Alternatively, input device 35 may consist of a touch screen or dedicated function keys. When input device 35 includes dedicated function keys, a position fix is initiated by operating a dedicated function key.

Referring back to FIG. 2, position data is received (step 21) from SATPS sources such as SATPS base unit 1 (FIG. 1) and optical sources such as optical unit 3. The optimum source of position data is then determined as shown by step 22. In one embodiment, the first source of position data to be received is determined to be the optimum source of position data. This allows for the fastest possible determination of position.

In the embodiment shown in FIG. 3, rover unit 2 receives position data via communication link 31. Communication link 31 includes a radio unit antenna 33 and a radio transceiver 32. The received position data can include SATPS data from a SATPS receiver such as SATPS base unit 1 of FIG. 1 and optical data from an optical system such as optical unit 3.

Referring back to FIG. 2, the determined optimum source of position data is then used to determine position as shown by step 23. When SATPS data is used to determine position, position is determined using any of a number of known methods. In one embodiment, position is determined using RTK methods that use carrier signals to accurately determine position.

Figure 4:
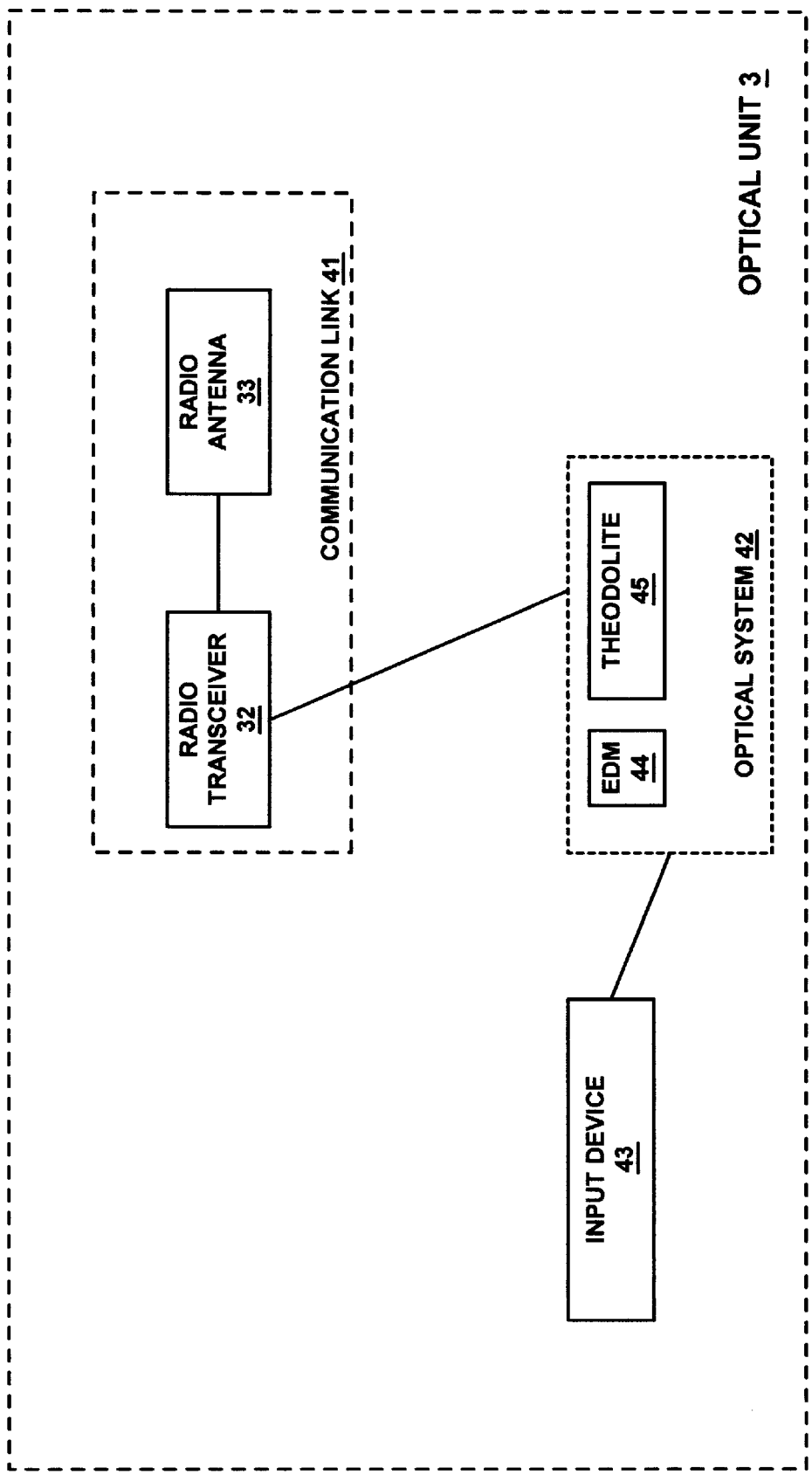
FIG. 4 is a diagram of an optical unit in accordance with the present claimed invention.

FIG. 4 shows an embodiment of optical unit 3 that includes input device 43. In one embodiment, optical unit 3 is placed at a known position and the position of optical unit 3 is manually input using input device 43. Input device 43 may be a standard alphanumeric keypad, or other device for data input. Alternatively, input device 43 is a numeric keypad, a touch screen or dedicated function keys operable in conjunction with a display (not shown).

Upon initiation of a position fix, rover unit 2 communicates with optical unit 3 via communication link 41 of FIG. 4. Communication link 41 includes radio antenna 33 and radio transceiver 32. Upon receiving a signal indicating initiation of a position fix, optical system 42 determines the position of rover unit 2(FIGS. 1 and 3). This may be done using any of a number of known optical sighting methods. In one embodiment, optical system 42 includes an electronic distance meter (EDM) 44 and a theodolite 45. EDM 44 transmits electromagnetic waves having wavelengths that lie in the near-infrared, infrared, visible or ultraviolet range that are used for determining distance. Theodolite 45 determines horizontal and vertical angles.

In one embodiment, optical target 34 of FIG. 3 is an optical target designed to reflect electromagnetic waves from optical system 42. That is, when EDM 44 transmits electromagnetic waves, optical target 34 of FIG. 3 is a target adapted to reflect electromagnetic waves back toward optical system 42. In one embodiment, optical target 34 of FIG. 3 is an array of antenna components that receive electromagnetic waves and retransmit the received electromagnetic waves at a microwave or infrared frequency. By analysis of the return radiation and the angles measured by theodolite 45, optical system 42 determines the position of rover unit 2. This position is then communicated to rover unit 2 via communication link 41 of FIG. 4. A system for determining position using an EDM and a theodolite is described in U.S. Pat. No. 5,471,218 which is incorporated herein by reference.

Preferably, the operation of optical unit 3 is automatic. That is, optical unit 3 automatically locates optical target 34 and determines the location of optical target 34. The calculations performed correspond to well known surveying calculations performed to determine the location of a target given the known location and bearing of the measurement device and the latitude and departure of the target from the measurement device. See e.g., Charles A. Herubin, *Principles of Surveying*, (Prentice Hall, 1991) pp 8–15. In one embodiment, a servo system (not shown) within optical unit 42 aligns theodolite 45 and EDM 44 with optical target 34 of FIG. 3.

Figure 5A:
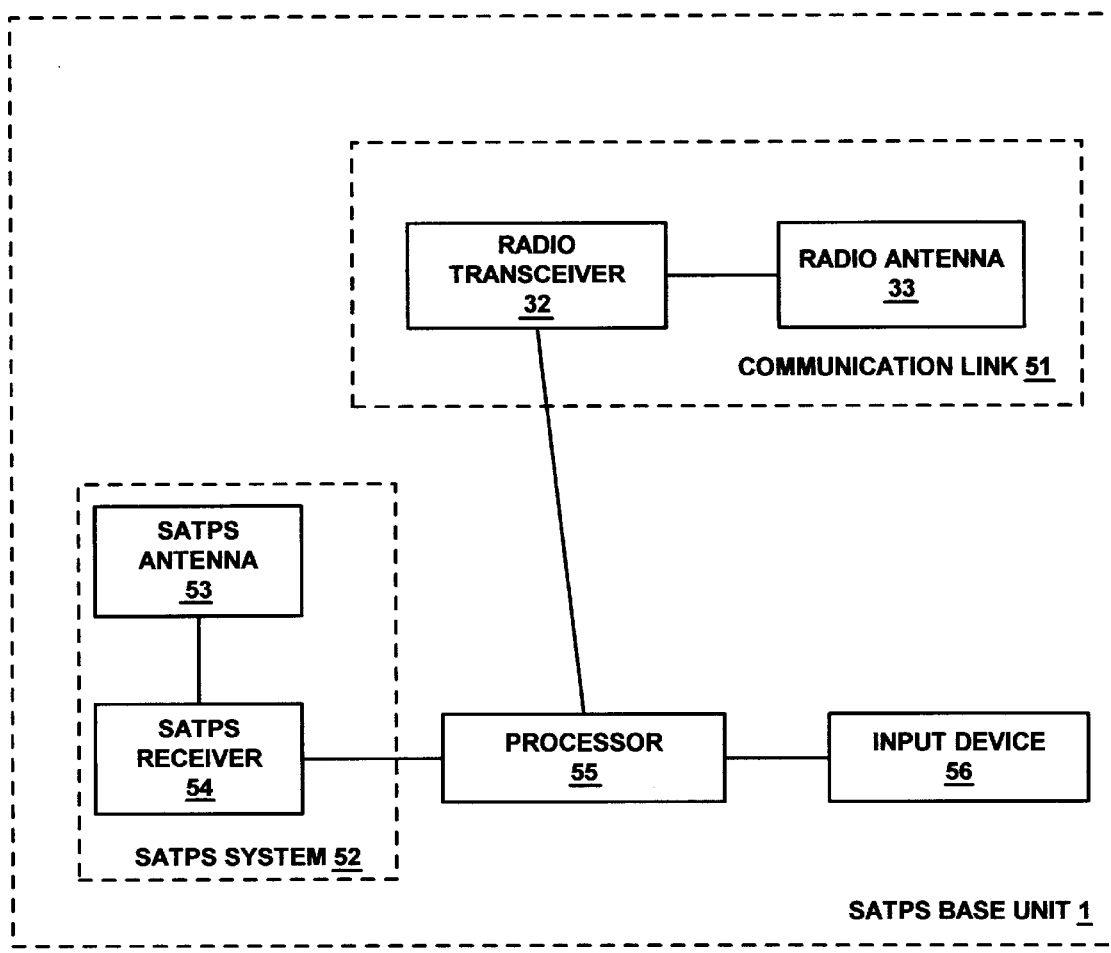
FIG. 5A is a diagram of a SATPS base unit in accordance with the present claimed invention.

FIG. 5A shows an embodiment of a SATPS base unit 1 adapted to receive SATPS signals from satellites of the SATPS and retransmit the received SATPS signals. SATPS system 52 includes SATPS antenna 53 that is adapted to receive signals from SATPS satellites. The received signals are processed by SATPS receiver 54 and are coupled to processor 55. Processor 55 controls the operation of SATPS base unit 1. In one embodiment, SATPS base unit 1 continually receives and retransmits signals received from SATPS satellites. Alternatively, SATPS base unit 1 receives transmissions from rover unit 2, and responds by transmitting signals received from SATPS satellites.

Continuing with FIG. 5A, communication link 51 is used to couple data between SATPS base unit 1 and rover unit 2. Communication link 51 includes radio transceiver 32 and radio antenna 33. Though rover unit 2, optical unit 3, and SATPS base unit 1 of FIGS. 3–5A are shown to include transceivers 32, alternatively, depending on the desired configuration of the system, a transmitter, a receiver, or a separate transmitter and receiver may be used.

In one embodiment, communication links 31, 41, and 51 of FIGS. 3–5A couple data over an unlicensed frequency such as, for example 144 MHz or 900 MHz. Alternatively, other frequency bands could be used for transmitting and receiving data. Alternatively, other methods for coupling data between optical unit 3, SATPS base unit 1 and rover unit 2 of FIGS. 1 and 3–5A may be used such as, for example infrared transmission.

The individual components of optical unit 3 may be incorporated into a single housing. Alternatively, one or all of the components of optical unit 3 may be separate units connected together. Similarly, the components of SATPS base unit 1 of FIG. 5A may be incorporated into a single housing. Alternatively one or all of the components of SATPS base unit 1 may be separate units that are connected together. When separate units are connected together, a communication port and corresponding cables are used, and preferably, the communication port and cables conform to an interface standard such as, for example, RS-232, RS-422, Ethernet, CAN bus/ISO11898/SAE-J1939, Mil-Std 1553, and the like.

Figure 5B:
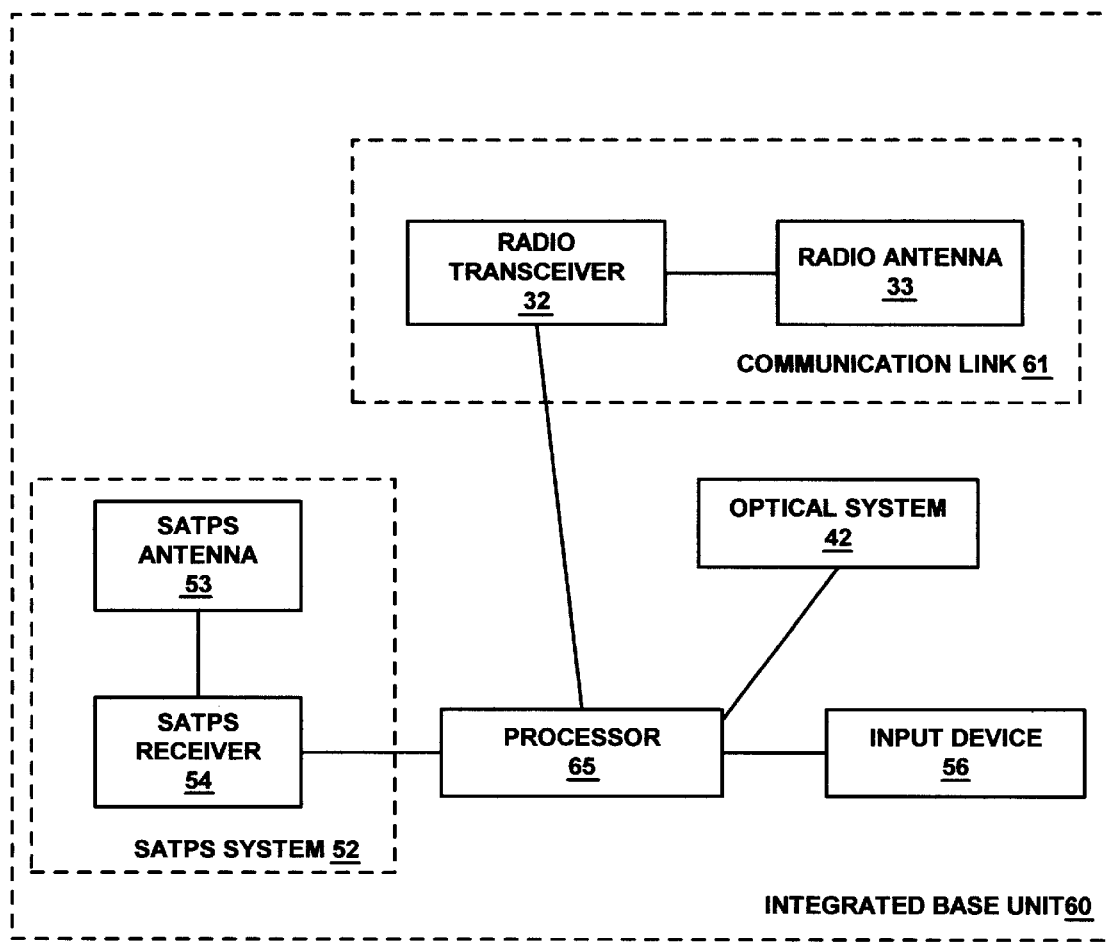
FIG. 5B is a diagram of an integrated base unit that performs the functions of a SATPS base unit and an optical unit in accordance with the present claimed invention.

In an alternate embodiment shown in FIG. 5B the functions of both optical unit 3 of FIG. 4 and SATPS base system 1 of FIG. 5A are incorporated into a single integrated unit that is shown as integrated base unit 60. In this embodiment, communication link 61 transmits and receives both SATPS data and optical data. In one embodiment, processor 65 controls the operations of SATPS system 52, optical system 42 and communication link 61. Input device 56 is operable to input necessary data for operation of optical system 42 and to configure SATPS system 52.

Referring now back to FIG. 3, survey logic unit 36 determines the optimum source of position data (step 22 of FIG. 2). When position is to be determined using SATPS data, SATPS data is received via communication link 31 and is coupled to SATPS processor 36 of SATPS system 30. Signals from satellites of the SATPS are received by SATPS antenna 39 and are coupled to SATPS receiver 40. SATPS processor 36 determines position using the SATPS signals received at SATPS antenna 39 and the signals from SATPS base unit 1.

At least three approaches can be used to determine position using SATPS data. In one approach, SATPS base unit 1 is located at a known location and SATPS data received by SATPS base unit 1 is transmitted to rover unit 2 along with the position of SATPS base unit 1. SATPS processor 36 uses the known location of SATPS base unit 1 and the SATPS data received by SATPS base unit 1 to determine the necessary corrections. SATPS processor 36 then accurately determines location using the determined corrections and signals from satellites of the SATPS received at SATPS antenna 39 and processed by SATPS receiver 40.

In a second approach, SATPS base unit 1 receives signals from satellites of the SATPS and uses its known position to determine the necessary corrections. These corrections are then transmitted to rover unit 2 which uses the correction information, along with signals received from satellites of the SATPS to accurately compute its position.

In a third approach, signals received from satellites of the SATPS are received at SATPS base unit 1 and are coupled directly to rover unit 2. At rover unit 2, signals received from satellites of the SATPS are used along with the signals received at base unit 1 to determine position of rover unit 2 using carrier phase measurement methods. Such methods are well known in the art and are commonly used in RTK position determination. In one embodiment, an appropriate algorithm that resolves integer phase ambiguity is used to determine position with centimeter level accuracy. A useful discussion of algorithms and methods for position determination using multiple SATPS receivers is contained in U.S. Pat. No. 5,519,620 titled Centimeter Accurate Global Positioning System Receiver for On-The-Fly Real-Time Kinematic Measurement and Control which is incorporated herein by reference. Another useful reference that is incorporated herein as background material is Jay Van Sickle, GPS for Land Surveyors (Ann Arbor Press, Inc. 1996) pp. 33–110.

In one embodiment, the SATPS of FIGS. 3–5B uses satellites of the GPS to determine position. In this embodiment, SATPS systems 52 is a standard GPS system as are commonly used in RTK positioning systems for determining position. That is, SATPS antenna 53 is a standard GPS antenna and SATPS receiver is a standard GPS receiver adapted to receive signals from satellites of the GPS. In this embodiment, SATPS system 30 of FIG. 3 is a standard GPS system, with SATPS antenna 39, SATPS receiver 40 and SATPS processor 36 adapted to determine position using satellites of the GPS and signals coupled from other GPS systems.

When position is to be determined using optical data, information is coupled to survey logic unit 36 from a source of optical data such as optical unit 3 of FIGS. 1 and 4. In one embodiment, the received information includes a determination of position that is calculated by optical unit 3. Alternatively, position is calculated by processor 37 using information coupled from optical unit 3. When position is calculated by processor 37, the information transmitted from optical unit 3 includes ranging information(i.e. the distance and direction from optical unit 3 to rover unit 2) and the position of optical unit 3. In one embodiment, the position of optical unit 3 (FIG. 4) and the alignment of optical unit 3 are coupled to processor 37 (FIG. 3) along with the angles measured by theodolite 45 and the distance measured by EDM 44.

Referring back to FIG. 2, once position is determined using the optimum source of position information, as shown by steps 20–23, the position is coupled to the user. In one embodiment, the position is displayed on a display device such as display device 31 of FIG. 3. Display device 31 is a liquid crystal display or other suitable display mechanism. Alternatively, or in conjunction with the display of the determined position on display device 31, the position is stored for later analysis (post-processing) in data storage device 38. In one embodiment, data storage device 38 is a Dynamic Random Access (DRAM), a Static Random Access Memory (SRAM), or a flash memory device.

In one embodiment, processors 37, 55 and 65 of FIGS. 3–5B are general-purpose microprocessors such as Motorola 68000 microprocessors. Alternatively, processors 37, 55 and 65 are an ASIC device or a FPGA device.

Figure 6:
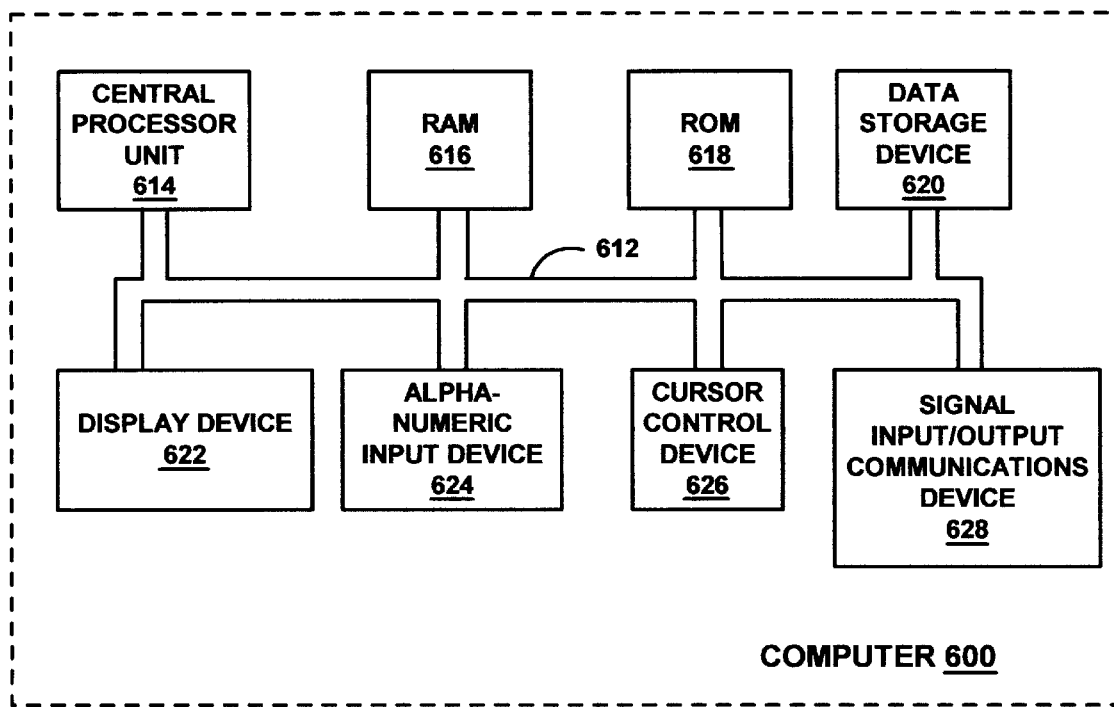
FIG. 6 is a schematic diagram illustrating an exemplary computer system used as part of a seamless survey system in accordance with the present claimed invention.

In one embodiment of the present invention, the seamless surveying system of the present invention is implemented in a computer such as computer 600 shown in FIG. 6. That is, the operations of survey logic unit 36 and/or display device 31 and input device 35 are performed by computer 600. It is appreciated that the computer 600 of FIG. 6 is exemplary only and that the present invention can operate within a number of different computer systems other than the computer system illustrated in FIG. 6. Other computing systems include general purpose computer systems, embedded computer systems, and stand alone computer systems specially adapted for use in the present invention.

Computer 600 of FIG. 6 includes an address/data bus 612 for communicating information, a central processor unit 614 coupled to bus 612 for processing information and instructions. Signal input and output communications device 628 of computer 600 is coupled to bus 612. In one embodiment, signal input and output communications device 628 includes a radio demodulator for demodulating radio signals which may be directly coupled from one or more antennas to input output communications device 628. Alternatively, radio signals may be received, demodulated and transmitted in digital form to input and output through communications device 628. Computer 600 also includes data storage features such as random access memory 616 coupled to bus 612 for storing information and instructions for central processor unit 614, read only memory 618 coupled to bus 612 for storing static information and instructions for the central processor unit 614, and data storage device 620 (e.g., a magnetic or optical disk and disk drive) coupled to bus 612 for storing information and instructions. Computer 600 also includes display device 622 which is coupled to bus 612 for displaying information (e.g., a map showing the position of the rover unit and/or the surveyed site, previously surveyed sites and data points, etc.) to an operator. Computer 600 may also include an output communications port for transmitting the position to external devices—either other computers or other user interfaces. An alphanumeric input device 624 including alphanumeric and function keys is coupled to bus 612 for communicating information and command selections to central processor unit 614. Computer 600 also includes cursor control device 626 that is coupled to bus 612 for communicating user input information and command selections to central processor unit 614.

Display device 622 of FIG. 6, utilized with computer 600 of the present invention is a liquid crystal device, cathode ray tube, or other display device suitable for creating graphic images and/or alphanumeric characters recognizable to the user. Referring now to FIG. 6, cursor control device 626 allows the computer user to dynamically signal the two dimensional movement of a visible symbol (cursor) on a display screen of display device 622. Many implementations of cursor control device 626 are known in the art including a trackball, mouse, touch pad, joystick or special keys on alphanumeric input device 624 capable of signaling movement of a given direction or manner of displacement. Alternatively, it will be appreciated that a cursor can be directed and/or activated via input from alphanumeric input device 624 using special keys and key sequence commands. The present invention is also well suited to directing a cursor by other means such as, for example, voice commands.

Figure 7:
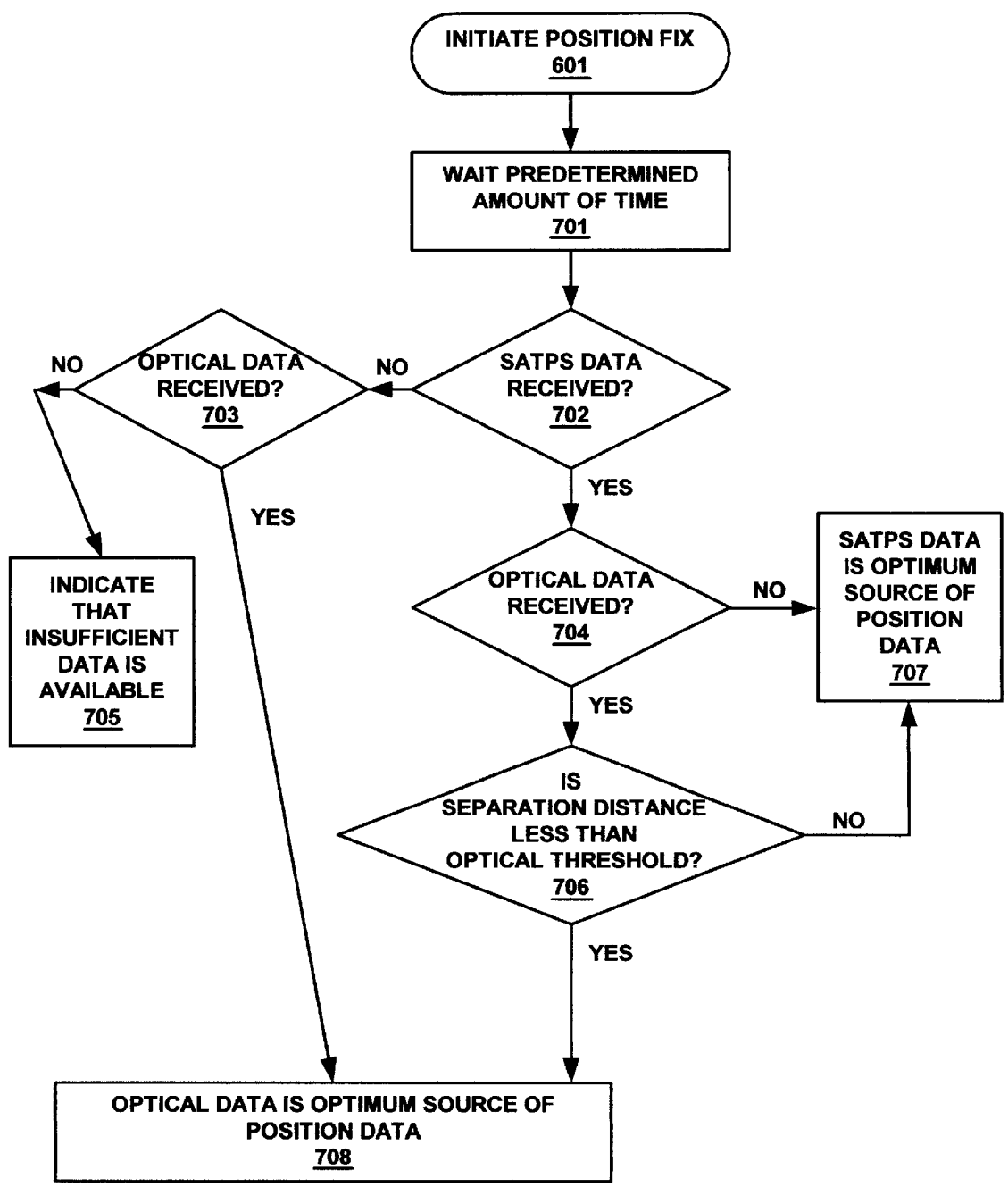
FIG. 7 is a flow chart illustrating a method for determining the optimum source of position data that uses separation distance in accordance with the present claimed invention.

With reference next to FIG. 7, a flow chart illustrating an alternate method for determining the optimum source of position data is shown. Upon initiating a position fix (step 601), a specified amount of time is allowed to pass as shown by block 701. The waiting period may be set, or may be user configurable. The waiting period is sufficient for communication to be received from both a SATPS base unit and an optical unit. In one embodiment, a time of 5 seconds is used. However, depending on the particular equipment being used, it may be desirable to increase or decrease the waiting period to optimize performance.

If, within the predetermined amount of time, SATPS data is not received as shown by decision block 702, and if optical data is not received as shown by decision block 703, accurate determination of the position of the rover unit is not possible. In that event, an indication that insufficient data is available to determine position will be given to the operator of the rover unit as shown by block 705. This indication may be conveyed to the operator of the rover unit by an indicator such as a light emitting diode, or by the display of text, or by use of voice messaging.

Continuing with FIG. 7, if only optical data is received (step 703), then optical data is used to determine position (step 708). If only SATPS data is received, as shown by steps 702 and 704, SATPS data is the optimum source of position data as shown by step 707.

Still referring to FIG. 7, when both SATPS data and optical data are received during the predetermined amount of time, a switch over threshold (hereinafter "optical threshold") is used to determine the best source of position data. That is, an optical threshold is determined such that optical position data give an accurate position fix when the distance between the optical unit and the rover is less than the optical threshold. In effect, the optical threshold determines the range within which optical position data is to be used. In one embodiment, the threshold is set at 100 meters. Alternatively, the threshold may be user-defined so as to allow the user to select a threshold that meets the user's specific needs.

Still referring to FIG. 7, as shown by block 706, if both optical data and SATPS data are available, and if the separation distance between the rover and the base station is less than the optical threshold distance, then the optical data is designated as the optimum source of position data as shown by block 708. When both optical data and SATPS data are available from a rover that is at a distance greater than the optical threshold distance, SATPS data is designated as the optimum source of position data as shown by block 707.

Figure 8:
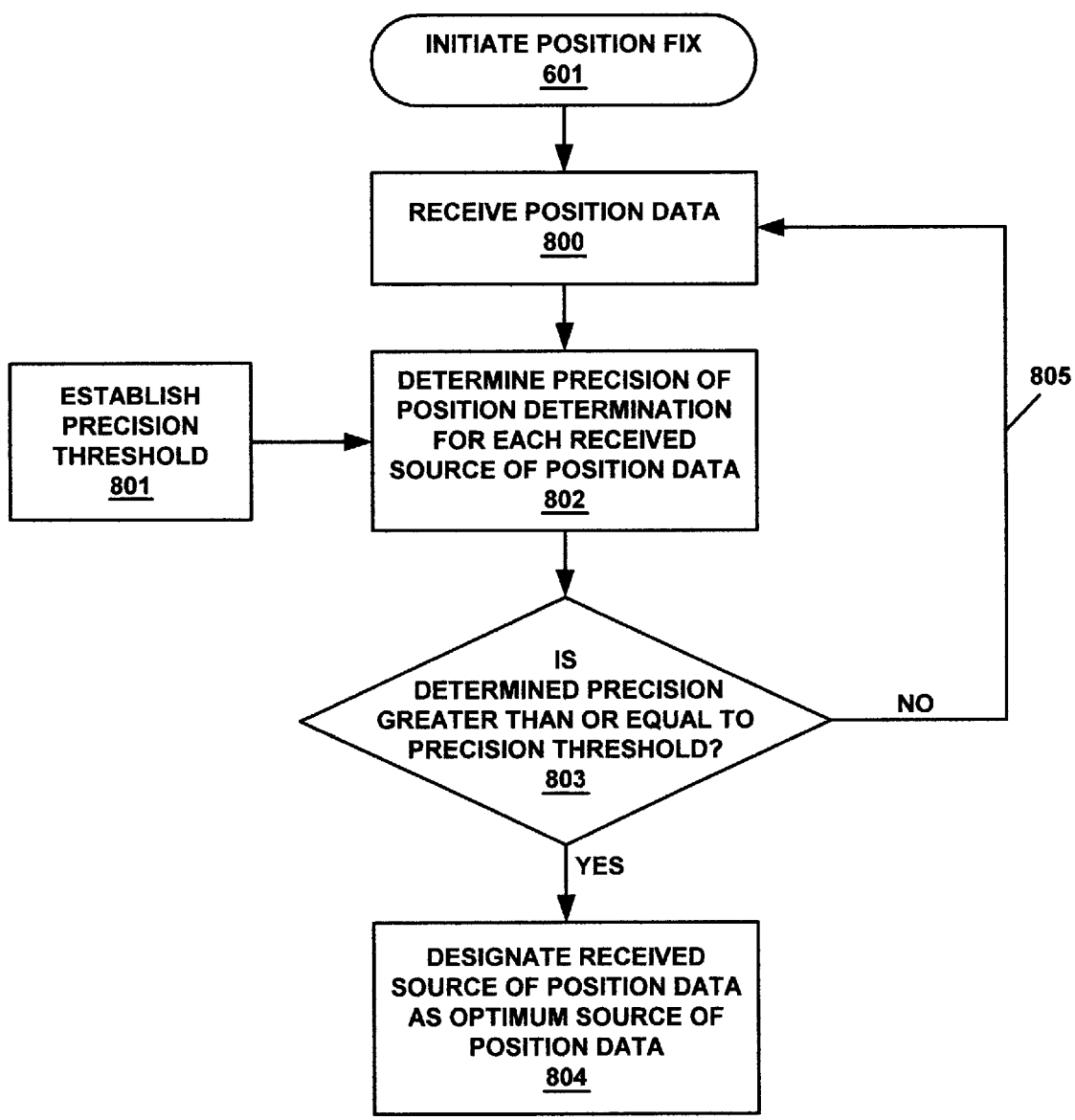
FIG. 8 is a flow chart illustrating a method for determining the optimum source of position data that uses a precision threshold in accordance with the present claimed invention.

In another embodiment that is shown in FIG. 8, the determination of the best source of position data is driven by the desired precision. That is, the user determines the desired precision such as, for example, two to three centimeters. This precision setting is used for determining the best source of position data. First, the desired precision threshold is established as shown by step 801. In one embodiment, the desired precision is set at two centimeters.

Continuing with FIG. 8, position data is received as shown by step 800. In one embodiment, a rover unit such as rover unit 2 of FIGS. 1 and 3 is used.

Still referring to FIG. 8, each type of incoming position data is analyzed to determine the precision of the determination of position that would be obtained using the incoming position data as shown by step 802. This process may be performed using any of a number of known methods. In one embodiment, the signal to noise ratio of incoming SATPS data is used. Alternatively, other factors such as the number of SATPS satellites received or the geometry of the received satellites is used in determining the precision. When the incoming data is optical data, the signal strength and/or the distance between the optical unit and the rover is used to determine the precision of the determination of position.

The determination of precision for each received source of position data is then compared to the precision threshold as shown by step 803. If the precision for a source of position data is greater than or equal to the precision threshold, that source of position data is selected as the optimum source of position data as shown by step 804. Otherwise, as shown by arrow 805, the process continues until such time that an incoming source of position data meets the established precision threshold. Thus, the first source of position data that gives a position within the desired accuracy range is designated as the optimum source of position data.

Referring now to FIG. 9, in one embodiment, weighting factors are applied so as to weight optical position data and SATPS position data separately. In one embodiment, separation distance and signal strength are used to weight each incoming optical data source.

Continuing with FIG. 9, the number of satellites received by the rover unit, distance between the rover unit and the base unit (separation distance), and RTK correction data accuracy are taken into account in weighing SATPS data. In one embodiment, RTK correction data accuracy is determined using the number of satellites received at the base unit, cycle slips, and measurement quality. Cycle slips are a function of the number of continuously locked measurements of correction data broadcast by the base station. Measurement quality is a statistical estimator of the inherent uncertainty of the measurement process. Measurement quality can take many forms, including standard deviation of the actual measurements, Root Mean Square (RMS), Circular Error Probability (CEP), Carrier/Noise Ratio (C/No), or some other Figure of Merit for relative comparison of different measurement sources.

Referring still to FIG. 9, the weighting factors for each variable are multiplied with the respective variable and the total for both optical data and SATPS data is summed. Whichever data source has the highest total is used as the optimum data source.

Figure 10:
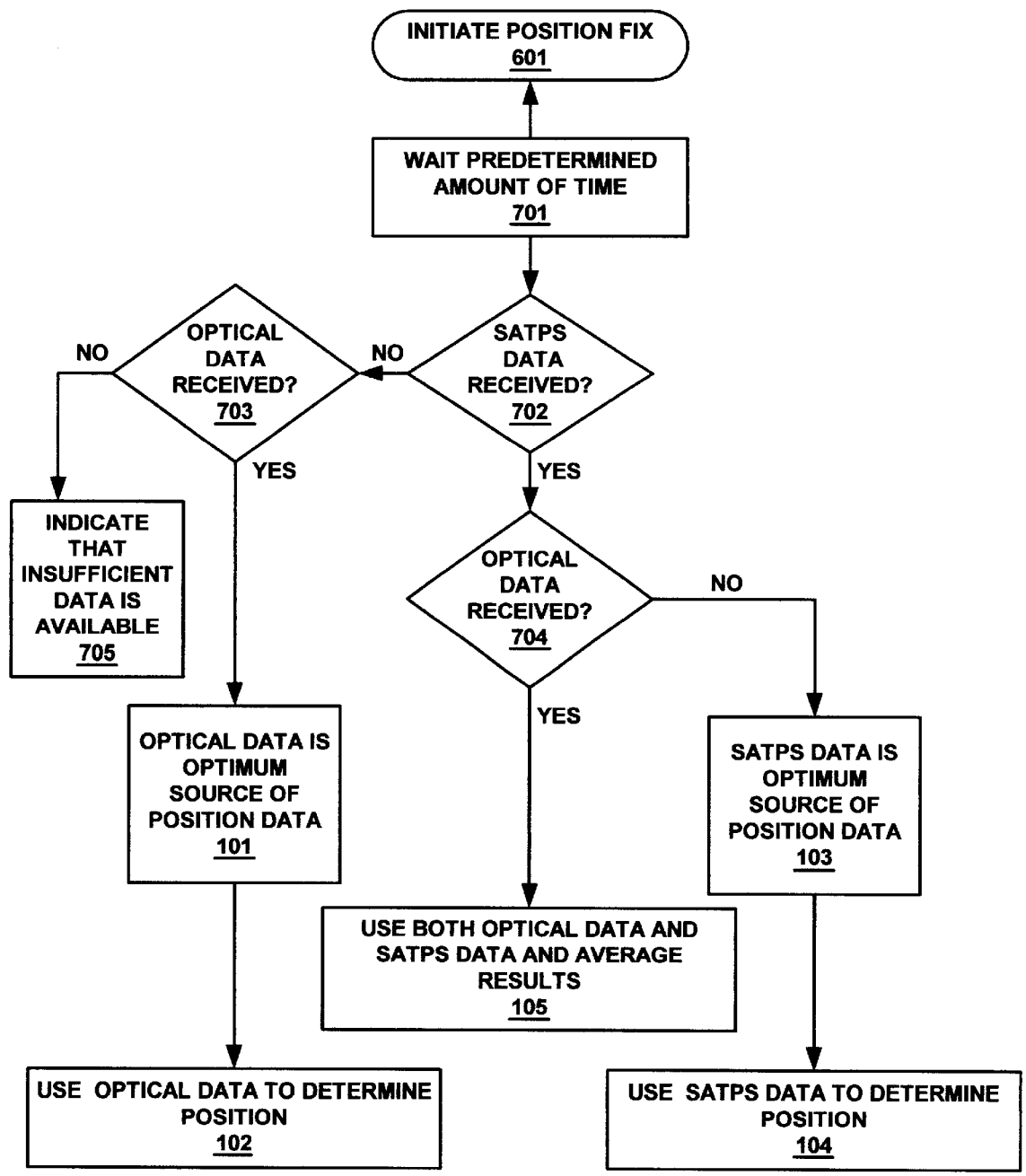
FIG. 10 is a flow chart illustrating a method for accurately determining position in accordance with the present claimed invention.

FIG. 10 shows yet another embodiment of the present invention. As shown by steps 601, 701–703 and 705, if no position data is received after a predetermined amount of time, an indication that insufficient data is available is given. If only one source of position data is available, that source of position data is designated as the optimum source of position data. More specifically, as shown by steps 701–703, when optical data is the only source of position data, optical data is designated as the optimum source of position data (step 101) and is used to determine position (step 102). Similarly, as shown by steps 701, 702 and 704, when SATPS data is the only source of position data, SATPS data is designated as the optimum source of position data (step 103) and is used to determine position (step 104).

Continuing with FIG. 10, when both optical data and SATPS data are received, both optical data and SATPS data are used to determine position and the results are averaged to determine position as shown by step 105.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for determining the optimum source of position data for a survey system that includes a first unit for obtaining SATPS data, a second unit for obtaining optical data and a third unit adapted to determine position, said method comprising:

a.) initiating a position fix;

b.) receiving position data at said third unit from ones of the group consisting of said first unit and said second unit; and c.) determining at said third unit the optimum source of position data using said position data received in step b.), and wherein the first received source of position data is designated to be the optimum source of position data.

2. A method for determining the optimum source of position data for a survey system that includes a first unit for obtaining SATPS data, a second unit for obtaining optical data and a third unit adapted to determine position, said method comprising:

a.) initiating a position fix;

b.) receiving position data at said third unit from ones of the group consisting of said first unit and said second unit;

c.) determining a precision threshold;

d.) determining the precision of the position determination for said position data;

e.) comparing said precision determined in step d.) to said precision threshold;

f.) returning to step b.) when said precision determined in step d). is less than said precision threshold; and g.) designating said position data to be the optimum source of position data when said precision determined in step d.) is greater than or equal to said precision threshold.

3. A method for determining the optimum source of position data for a survey system that includes a first unit for obtaining SATPS data, a second unit for obtaining optical data and a third unit, adapted to determine position, said method comprising:

a.) initiating a position fix;

b.) receiving position data at said third unit from ones of the group consisting of said first unit and said second unit;

c.) determining weighting factors for variables relating to SATPS data and optical data;

d.) multiplying variables relating to SATPS data by ones of said weighting factors and adding the results so as to obtain a first sum when both SATPS data and optical data are received during step b.);

e.) multiplying variables relating to optical data by ones of said weighting factors and adding the results so as to obtain a second sum when both SATPS data and optical data are received during step b.);

f.) designating SATPS data to be the optimal source of position data when said first sum is greater than said second sum; and g.) designating optical data to be the optimal source of position data when said first sum is not greater than said second sum.

4. In a computer system including a processor coupled to a bus, and a memory unit coupled to said bus for storing information, a computer-implemented method for determining the optimum source of position data for a survey system which includes a first unit adapted to receive SATPS data and a second unit adapted to obtain optical data, said computer implemented method comprising:

a.) initiating a position fix;

b.) receiving position data from ones of said first unit and said second unit; and c.) determining the optimum source of position data using said position data received in step b.), and wherein the first received source of position data is designated to be the optimum source of position data.

5. In a computer system including a processor coupled to a bus, and a memory unit coupled to said bus for storing information, a computer-implemented method for determining the optimum source of position data for a survey system which includes a first unit adapted to receive SATPS data and a second unit adapted to obtain optical data, said computer implemented method comprising:

a.) initiating a position fix;

b.) receiving position data from ones of said first unit and said second unit;

c.) determining a precision threshold;

d.) determining the precision of the position determination for said position data;

e.) comparing said precision determined in step d.) to said precision threshold;

f.) returning to step b.) when said precision determined in step d.) is less than said precision threshold; and g.) designating said position data to be the optimum source of position data when said precision determined in step d.) is greater than or equal to said precision threshold.

* * * * *